Patented July 8, 1947

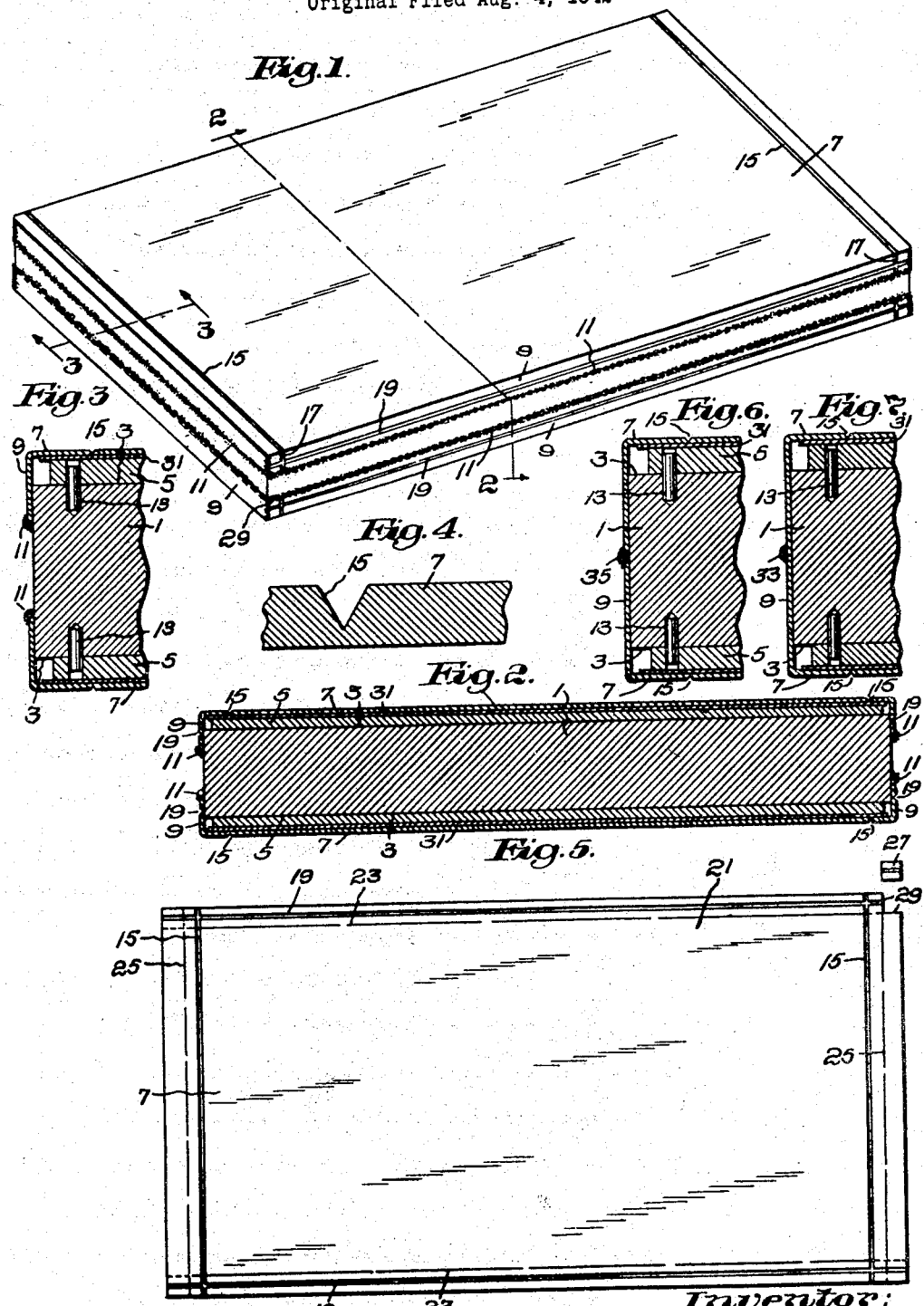

2,423,811

UNITED STATES PATENT OFFICE 2,423,811

WELDING ASSEMBLY

Joseph M. Goulding, Fairhaven, Mass., assignor to Revere Copper and Brass Incorporated, New York, N. Y., a corporation of Maryland Original application August 4, 1942, Serial No. 453,494. Divided and this application September 2, 1943, Serial No. 500,915

11 Claims. (Cl. 29—187.5)

My invention relates to welding metals by pressure while in the plastic condition, particularly to welding metal elements in the manufacture of so-called "bi-metallic" sheets, strips, and the like, the present application being a division of my pending application Serial Number 453,494, filed August 4, 1942.

The invention, which has among its objects an improved assembly of metal slabs or other metallic elements having relatively large surfaces to be welded, will be best understood from the following description when read in the light of the accompanying drawings of examples of such assembly, while the scope of the invention will be more particularly pointed out in the appended claims.

In the drawings:

Fig. 1 is an isometric view of an assembly packet according to the invention;

Figs. 2 and 3 are sections, on enlarged scales, on the lines 2—2 and 3—3, respectively, of Fig. 1;

Fig. 4 illustrates a detail, on an enlarged scale;

Fig. 5 is a plan of a blank from which one of the covers of the assembly packet according to Figs. 1 to 4 may be formed; and Figs. 6 and 7 are sections corresponding to Fig. 3 showing modified forms of the assembly packet.

The present invention, without limitation thereto, is particularly adapted for use in connection with forming so-called bi-metallic sheets and strips comprising iron or steel sheets or strips clad on one or both sides with another metal such as copper, or copper base alloys such as cupronickel and gilding metal.

Generally speaking, the process is performed by placing a rather thick slab, flat bar, or the like (for convenience in terminology hereinafter and in the appended claims termed a slab) of the cladding metal on a similar rather thick shape of steel, heating the slabs thus assembled until they become plastic enough to be welded, and passing them in such plastic condition between the pressure rolls of a mill for welding them together. The rolls of the mill are effective to elongate the slabs in rolling direction and thus reduce their thickness. By repeatedly passing the slabs while they are hot between the rolls of the mill, strips of considerable length and thin gauge may be formed. For example, a steel slab 24 inches wide, 48 inches long, and 3 inches thick, upon which is placed a copper slab ⅜ inch thick and approximately of the same width and length as the steel slab, may be thus operated upon to produce a strip about 24 inches wide and 36 feet long, in which the steel is about 0.335 inch thick clad with copper about 0.04 inch thick.

According to one way of practising the invention, a steel slab 1 is treated thoroughly to clean its opposite faces 3, say by pickling those faces and washing them to remove all traces of the pickling solution, or by subjecting the faces to grinding operations for rendering them clean and smooth. Not necessarily, but preferably, these faces are then coated with a flash of copper for preventing them from subsequently rusting or oxidizing. This flash of copper may be applied, for example, by dipping the faces of the slab in a 1% solution of sulphuric acid containing about 10 ounces copper sulphate per gallon. In contact with these faces of the steel slab may then be placed slabs 5 of the cladding metal, the surfaces of the cladding metal which contact the steel slab also being treated by pickling or grinding thoroughly to clean those surfaces. Over the slabs 5 may then be placed pan-like cover members 7 having side walls 9, which side walls extend over the edges of the steel slab in closely adjacent relation thereto. The entire assembly may then be placed in a press to force one pan-like cover toward the other and the slabs 1 and 5 into intimate contact, and, while the assembly is under pressure, the edges of the rims of the covers throughout their entire extent may be electric welded to the edges of the steel slab, as indicated at 11 in Figs. 1, 2 and 3, to hermetically seal the joints between them, this welding operation preferably being performed by electric arc deposition of a metal welding rod.

Preferably the slabs 5 of the cladding metal are of slightly shorter length and narrower width than the steel slab 1, as indicated in Figs. 2 and 3, to permit any slight creep of the slabs 5 relative to the slab 1 during the first rolling pass for welding the slabs together. The tight fit of the parts consequent upon the pan-like covers being welded in position while the packet is under pressure will ordinarily prevent any sliding of the slabs 5 relative to the slab 1, but to insure against such sliding the end portions of the slabs may, if desired, be "pegged" together, say by use of dowels 13 driven into aligned drill holes in the slabs 1 and 5, before the pan-like covers are placed in position. These dowels may be of iron, and preferably are of small diameter, say in the order of ¼ inch, so as to have no particular resistance against shear when the assembly is heated to the welding temperature of the slabs. Commonly, a single dowel at each end of the slabs will suffice.

The covers, which preferably are made of sheet iron and are relatively thin, say about 1/16 inch thick, are formed adjacent the peripheries of the slabs with frangible portions which will break and permit removal of the covers during the initial part of the rolling operation. These frangible portions, as illustrated, are formed by providing the bottoms of the covers adjacent each end thereof with a transverse groove 15, these grooves at each end being continued over the adjacent side walls 9 of the covers as indicated at 17 (Fig. 1), while connecting the grooves 17 are grooves 19 extending longitudinally along the side walls 9 lengthwise of the slabs. These grooves 15, 17 and 19 in cross-section are preferably V-shaped, as illustrated in Fig. 4. The depth of the grooves is not critical so long as they provide a materially diminished cross-section of the bottom and side walls of the covers. With covers made of 1/16 inch sheet iron satisfactory results have been obtained in practice with grooves about 0.04 inch deep.

Conveniently the pan-like covers may be made from sheet iron blanks 21 in which the grooves 15, 17 and 19 are formed. The blanks may be bent on the lines 23 and 25 to form pan-shaped covers after cutting out pieces 27 between the bending lines 23 and 25 and the corners of the blanks. The edges 29 where the longitudinal and transverse side walls 9 of the covers meet may be electric welded together for hermetically sealing the joints at those edges, either prior to placing the covers in position, or, preferably, at the time the rims of the covers at the cover openings are being welded to the steel slab 1.

To insure against the bottoms of the covers being welded to the slabs 5 they are preferably made of unpickled or black sheet iron or steel, the scale on such iron or steel preventing the covers from welding to these slabs. Better to insure against this welding, the inner surfaces of the bottoms of the pan-like covers may be coated with colloidal graphite, say by mixing colloidal graphite powder and water to form a thick paste and painting the inner surfaces of the bottoms of the covers with such paste. Preferably, however, to prevent any irregularities present in the bottoms of the covers from causing irregularities in the outer faces of the slabs 5 when the packet is rolled, there are interposed between those faces and the bottoms of the covers smooth sheets 31 of unpickled black iron or steel, the sides of which sheets in contact with the slabs 5, or, if desired, both sides thereof, are preferably coated with colloidal graphite. Also, if desired, the sheets 31 may be of rolled copper-silicon alloy, which sheets do not necessitate the use of the colloidal graphite because having thereon a film of silicon oxide they will not weld to either the covers or the slabs 5.

Instead of welding the side walls 9 of the pan-like covers to the steel slab, such walls may be of requisite length to abut each other and enable them to be welded together as indicated at 33 in Fig. 7, or may be slightly shorter, as shown in Fig. 6, to enable them to be welded to both each other and the steel slab, as indicated at 35 in Fig. 6.

After the packet is formed it may be placed in a furnace and heated to the welding temperature of the slabs, say to about 1850° F. when the slabs 5 are of copper, at which welding temperature all the slabs are in a plastic condition.

During the heating of the packet in the furnace and after it is removed therefrom in a heated condition the covers protect the steel slab from oxidizing and scaling, which scaling if it occurred would prevent the slabs from welding together during the subsequent welding operation. The heated packet may then be removed from the furnace and passed between the pressure rolls of a rolling mill to weld the slabs together, and by repeatedly passing them between the rolls the welded together slabs may be reduced to form long relatively thin strips of the bi-metal.

During the first or second pass of the packet between the rolls of the mill the consequent elongation of the slabs and cooling of the covers are effective to rupture the covers at the above described frangible portions thereof, permitting the covers to be stripped from the slabs at that time, whereupon the rolling operation may be continued. It will be observed that the covers, being at the exterior of the packet and in contact with the relatively cool rolls of the mill, cool more rapidly than the slabs, which cooling is augmented by the fact that the thin gas film between the bottom of each cover and the adjacent face of the slab acts as an insulating layer to diminish conduction of heat from the slabs 5 to the cover, as likewise act the sheet 31 and the graphite layer or layers when either is employed between the cover and slab 5. The material of the covers at the bottoms of the grooves 15, 17 and 19 consequently ruptures when the slabs are elongated, because the covers, particularly their bottoms, having somewhat cooled resist elongation to the extent that the slabs elongate, while the transverse side walls of the covers are forced to move with the ends of the slabs, and those portions of the longitudinal side walls of the covers not electric welded to the steel slab have no particular tendency to elongate at all.

After the slabs are reduced by the rolling operation to form the above described relatively thin strips of bi-metal, the ends and sides of said strips may be trimmed by a splitting operation to remove the remnants of the covers and the weld metal for securing the covers in position, it being understood that the rolled strips almost always are subjected to such a trimming operation after being rolled, and therefore removing the remnants of the covers and the weld metal in this way involves no additional operation.

In place of a steel slab, a slab of any other suitable metal may be employed, as is likewise the case with the cladding metal. Further, when desired but one side of the steel or other base slab may be clad with another metal, in which case it is necessary to employ but one pan-like cover, which latter may be placed over the slab of cladding metal and be welded at the cover opening to the edges of the steel or other base slab as shown by Figs. 1, 2 and 3, that is to say, in such case one of the covers of these figures would be omitted. It will be observed that in all these cases, whether the steel or other base slab is to be clad on one or both sides, the pan-like cover or covers employed in substance cause the slabs to be boxed or enclosed in a container for excluding air and gases from the area or areas of separation of the slabs.

It will be understood that, within the scope of the appended claims, wide deviations may be made from the forms of the invention herein described without departing from the spirit of the invention.

I claim:

1. A welding assembly having a pair of metal slabs in superimposed welding relation, a sheet metal container enclosing said slabs, said container having a line-like frangible portion of reduced thickness adjacent the peripheries of the slabs adapted to be ruptured for separating the container by elongation of the slabs upon the heated assembly being subjected to a rolling operation for effecting welding of the slabs.

2. A welding assembly according to claim 1 which includes a heat insulating layer between the container and adjacent slab face.

3. A welding assembly having a pair of metal slabs in superimposed welding relation, a sheet metal container enclosing said slabs, said container being grooved adjacent the peripheries of the slabs to form a frangible portion adapted to be ruptured for separating the container by elongation of the slabs upon the heated assembly being subjected to a rolling operation for effecting welding of the slabs.

4. A welding assembly according to claim 3 in which the container has a groove extending lengthwise of each edge wall thereof from adjacent one end wall of the container to the other, and has grooves adjacent each end wall thereof connecting the end portions of the first mentioned grooves.

5. A welding assembly according to claim 3 in which the container has a groove extending lengthwise of each edge wall thereof from adjacent one end wall of the container to the other, and has grooves adjacent each end wall thereof connecting the end portions of the first mentioned grooves, the assembly including an insulating layer between the container and adjacent slab face.

6. A welding assembly having a pair of metal slabs in superimposed welding relation, a pan-like sheet metal cover receiving said slabs, the peripheral walls of which cover are secured to the end and side edges of the slab remote from the bottom of said cover in hermetically sealed relation thereto, said cover adjacent the peripheries of said slabs having a line-like frangible portion of reduced thickness adapted to be ruptured for separating the cover by elongation of the slabs upon the heated assembly being subjected to a rolling operation for effecting welding of the slabs.

7. A welding assembly according to claim 6 in which the peripheral walls of the pan-like cover are continuously welded at their edges to the end and side edge surfaces of the slab remote from the bottom of the cover.

8. A welding assembly according to claim 6 in which the frangible portion of the pan-like cover is formed by a groove extending about the cover adjacent the edge walls of the slabs.

9. A welding assembly according to claim 6 in which the frangible portion of the pan-like cover is formed by a groove extending about the cover adjacent the edge walls of the slabs, the assembly including an insulating layer between the bottom of the pan-like cover and adjacent slab face.

10. A welding assembly having three metal slabs in superimposed welding relation for adapting the outer slabs to be welded to opposite faces respectively of the middle slab, separate pan-like sheet metal covers over each of the outer slabs, the peripheral walls of which covers are continuously welded at their edges to the end and side edge surfaces of the middle slab, the walls of said covers having line-like frangible portions of reduced thickness adjacent the end and side edges of said slabs adapted to be ruptured for separating the covers by elongation of the slabs upon the heated assembly being subjected to a rolling operation for effecting welding of the slabs.

11. A welding assembly having three metal slabs in superimposed welding relation for adapting the outer slabs to be welded to opposite faces respectively of the middle slab, separate pan-like sheet metal covers over each of the outer slabs, said pan-like covers being welded to each other at the cover openings, the walls of said covers having line-like frangible portions of reduced thickness adjacent the end and side edges of said slabs adapted to be ruptured for separating the covers by elongation of the slabs upon the heated assembly being subjected to a rolling operation for effecting welding of the slabs.

JOSEPH M. GOULDING.

REFERENCES CITED

The following references are of record in the file of this patent:

UNITED STATES PATENTS

| Number | Name | Date |
| --- | --- | --- |
| 1,956,818 | Acre | May 1, 1934 |
| 2,074,352 | Armstrong | Mar. 23, 1937 |
| 2,079,213 | Ingersoll | May 4, 1937 |

FOREIGN PATENTS

| Number | Country | Date |
| --- | --- | --- |
| 122,231 | Great Britain | Jan. 9, 1919 |